US000001981H

(19) United States

(12) Statutory Invention Registration (10) Reg. No.: US H1981 H

Hennick (43) Published: Aug. 7, 2001

(54) BEARING STRESS-FREE LOCKING DEVICE

(75) Inventor: Kevin R. Hennick, Summerville, SC (US)

(73) Assignee: The United States of America as represented by the United States Department of Energy, Washington, DC (US)

(21) Appl. No.: 09/572,841

(22) Filed: May 18, 2000

(51) Int. Cl.[7] ..... F16B 39/02

(52) U.S. Cl. ..... 411/87; 411/95; 411/102

(58) Field of Search ..... 411/87, 88, 95, 411/97, 102, 119, 120, 121

(56) References Cited

U.S. PATENT DOCUMENTS

| | | | |
|---|---|---|---|
| 516,563 | * | 3/1894 | Butler . |
| 2,469,441 | * | 5/1949 | Pitisci . |
| 4,105,058 | * | 8/1978 | Bunn . |
| 4,607,422 | * | 8/1986 | Scaramucci . |
| 4,772,448 | * | 9/1988 | Popalis . |
| 4,906,150 | * | 3/1990 | Bennett . |
| 5,624,218 | * | 4/1997 | Dauwalter . |

FOREIGN PATENT DOCUMENTS

2903706 * 8/1980 (DE) ..... 411/97

* cited by examiner

*Primary Examiner*—Harold J. Tudor

(74) *Attorney, Agent, or Firm*—John T. Lucas; Virginia B. Caress; Paul A. Gottlieb

(57) ABSTRACT

A locking device is provided for preventing adjacent threaded fasteners from rotating while not bearing any of the preload stress of the fasteners. The locking device includes: a plurality of locking rings, each locking ring being of sufficient diameter to surround the sides of one of the adjacent fastener heads and wherein each locking ring is made from a pliable material such that the locking ring may be deformed to closely fit its associated fastener head; and a torque member, connected to each locking ring, for providing torque to prevent each locking ring and its associated bolt head from rotating.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BEARING STRESS-FREE LOCKING DEVICE

CONTRACTUAL ORIGIN OF THE INVENTION

The United States Government has rights in this invention pursuant to Contract Number DE-AC11-88PN38014 between the United States Government and Westinghouse Electric Corporation.

BACKGROUND OF THE INVENTION

1. Field of the Invention

The present invention relates to locking devices which are used to provide torque to prevent a threaded fastener (bolt and nut, cap screw, or the like) from rotating and, more particularly, to a locking device which, in addition to providing torque, does not bear any preload stress from the fastener head.

2. Prior Art

In many applications, bolts and nuts or cap screws are used to join components. A significant number of these applications require that these threaded fasteners be tightened to a very high torque. This torque creates a large amount of preload stress between the fastener head (or nut) and the component. Even with these highly torqued fasteners, a common problem is that, under certain conditions, particularly when the components vibrate, the fasteners tend to work loose. This problem has been addressed in the prior art by the use of several devices which are designed to prevent an individual bolt or nut from rotating, including various types of lock washers, lock nuts, castle nuts with cotter pins, etc. Each of these devices has its own drawbacks, however. Lock washers fit between the bolt head (or nut) and the component and, therefore, must bear the preload stress that is incurred by tightening the bolt. Additionally, lock washers provide only a limited amount of torque to prevent rotation of the bolt. Lock nuts, while typically not bearing any preload stress, also provide a limited amount of torque to the bolt. Castle nuts with cotter pins, like several other types of locking devices, require a particular orientation of the bolt (or nut) and, therefore, do not allow the bolt to be tightened as desired.

Another type of locking device, called a locking plate and shown in FIG. 1, has been developed for use with two or more adjacent bolts. In FIG. 1, a locking plate L is shown used with fasteners (bolts), having fastener heads (bolt heads) f1 and f2, that hold a first component C1 to a second component C2. As illustrated, the locking plate L has a flat base portion having holes (not shown), each of which is positioned between a respective bolt head (f1 or f2) and the component C1, much like a washer, and the tabs b which can be bent to wrap around the sides of the respective bolt head f1 or f2 to secure the bolt head in a particular orientation with respect to the base portion. Thus, because the base portion is constrained from rotating by at least two bolts, the bolt heads (f1 and f2) also cannot rotate.

The lockplate L has several drawbacks. First, the tabs b often are not aligned properly with the bolt head when the bolt head is tightened to the desired torque and, therefore, the tabs b provide reduced holding power. Second, because the lockplate L is positioned between the bolt heads f1 and f2 and the component C1, it bears the preload stresses created by tightening the bolts. While these stresses are not too large for a hardened bolt, they are too large for the locking plate L which must be made from a softer material in order to allow the tabs to be bent around the bolt head. This softer material yields under high preload stresses.

Moreover, hardened material cannot be used for the lock plate because, while extreme force might be applied to bend tabs made from hardened material, such force could cause the hardened material to crack. Additionally, while providing additional material under the bolt head would increase the load capacity of the soft lockplate, this solution is difficult to implement because the diameter of the holes in the lockplate must include sufficient tolerance to allow for variations in fastener diameter as well as variations in the distance between fasteners. Further, the use of larger fastener heads is also not a suitable solution because many applications require a particular size fastener head, either because of space, material, or financial constraints.

SUMMARY OF THE INVENTION

In accordance with the present invention, a locking device is provided which overcomes the drawbacks of the prior art devices described above. A locking device for preventing adjacent threaded fasteners from rotating is provided which comprises: a plurality of locking rings, each locking ring being of sufficient diameter to surround the sides of one of the adjacent fastener heads and wherein each locking ring is made from a pliable material such that the locking ring may be deformed to closely fit its associated fastener head; a torque member, connected to each locking ring, for providing torque to prevent each locking ring and its associated bolt head from rotating.

After the fasteners are tightened to the desired torque, the locking device is installed by placing a locking ring over each fastener head and deforming each locking ring to closely fit each fastener head.

In further accordance with an alternate embodiment of the present invention, fasteners with special fastener heads are provided to be used in conjunction with the disclosed locking device. In particular, the fastener heads include indentations around the sides of the heads and, after the fasteners have been tightened, the locking rings of the fastener device are crimped such that they protrude into the indentations. Advantageously, the indentations are formed longitudinally with respect to the fastener head and are taller than the locking rings. With this feature, when the locking rings are crimped so as to protrude into the indentations, the top of the indentations prevents the locking rings from sliding off of the fastener head.

In a preferred embodiment, the torque member is an arm which is radially connected to each locking ring and, advantageously, the width of such an arm may be varied depending upon the amount of torque required to prevent rotation of the fasteners.

In a further embodiment of the invention, the locking device is comprised of a plurality of locking rings connected by a plurality of torque members. This embodiment of the invention is useful for providing locking devices for such applications as pipe flanges, bolt plates, and the like, which are manufactured with predetermined bolt patterns.

Other objects, features, and advantages of the present invention will be set forth in, or will become apparent from, the detailed description of the preferred embodiments of the invention which follows.

DESCRIPTION OF THE PREFERRED EMBODIMENTS

Figure 2:
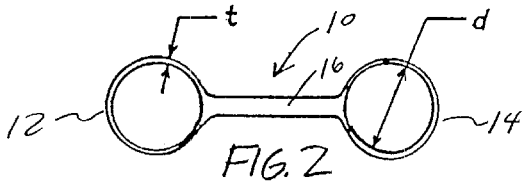
FIG. 2 is a plan view of a locking device in accordance with an embodiment of the invention.
Figure 3:
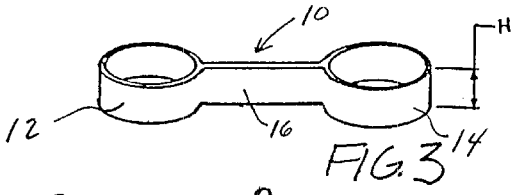
FIG. 3 is perspective view of the locking device of FIG. 2.
Figure 4:
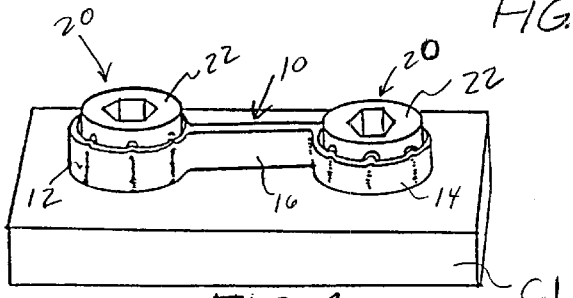
FIG. 4 is a perspective view of the locking device of FIG. 2 in use with fasteners of the type shown in FIG. 5.
Figure 5:
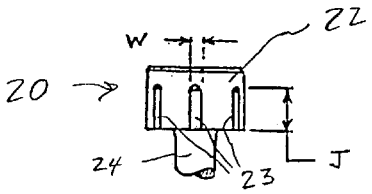
FIG. 5 is an elevational view of a first embodiment of a fastener in accordance with the invention.
Figure 6:
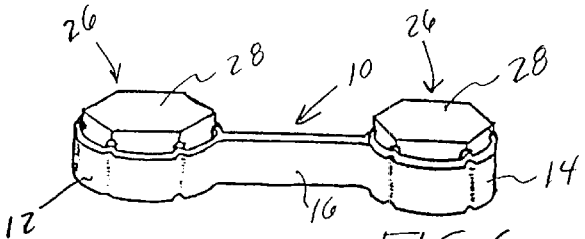
FIG. 6 is a perspective view of the locking device of FIG. 2 in use with fasteners of the type shown in FIG. 7.
Figure 7:
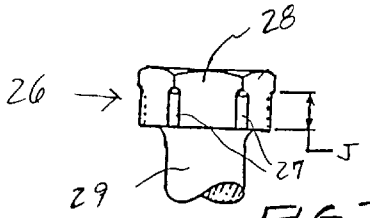
FIG. 7 is an elevational view of a second embodiment of a fastener in accordance with the invention.

A preferred embodiment of the locking device of the present invention is shown in FIGS. 2 through 4 and in FIG. 6. Locking device 10 can be used with different fasteners and two specialized fastener embodiments are shown in FIGS. 4 and 5 and in FIGS. 6 and 7, respectively. In FIG. 4, the locking device, which is generally denoted 10, is shown in use with two fasteners 20 having fastener heads 22. Fastener 20, which is shown in more detail in FIG. 5, is one embodiment of a fastener in accordance with the present invention. Locking device 10 is further shown in FIG. 6 in use with two fasteners 26 having fastener heads 28. Fastener 26, which is shown in more detail in FIG. 7, is a second embodiment of a fastener in accordance with the present invention.

As shown in FIGS. 2 to 4, and 6, locking device 10 comprises locking rings 12 and 14 which are connected to opposite ends of torque member 16. Locking rings 12 and 14 each have an inside diameter d, which is at least slightly larger than the diameter of the corresponding fastener head 22 (or 28), and a thickness t which is sufficient to withstand the necessary torque while still being pliable such that locking rings 12 and 14 can be deformed to closely fit the corresponding fastener head 20 (or 22). If the fastener heads with which locking device 10 is to be used are of different diameters, locking rings 12 and 14 can be different diameters as well.

Torque member 16 is of sufficient length so that locking rings 12 and 14 are centered over adjacent fastener heads 22 (or 28). The thickness of torque member 16 may be appropriately varied to provide sufficient torque while using a minimum of material and allowing for efficient manufacture of the device. Of course, the cross sectional shape of torque member 16 may also be varied for similar purposes.

Fastener 20 shown in FIG. 5 is an Allen head cap screw including fastener head 22 and shank 24. While only a portion of shank 24 is shown, it comprises a standard, threaded shank. Fastener head 22 is cylindrical in shape and includes indentations 23 which are circumferentially spaced around the sides of fastener head 22. In the embodiment shown in FIG. 5, the height J of indentations 23 is slightly greater than the height H of locking rings 12 and 14.

Fastener 26 shown in FIG. 7 is a hex-head bolt including fastener head 28 and shank 29. Similarly to shank 24 above, while only a portion of shank 29 is shown, it comprises a standard, threaded shank. Fastener head 28 is hexagonal in shape and includes indentations 27 at the vertex of each of the six sides of fastener head 28. As in FIG. 5, in the embodiment shown in FIG. 7, the height J of indentations 23 is slightly greater than the height H of locking rings 12 and 14. In an alternative embodiment discussed in connection with FIGS. 9 and 10, the indentations are provided in the faces of the hex-head bolt rather than at the edges or vertices between the faces.

In FIG. 4, locking device 10 is shown in use with fasteners 20. After fasteners 20 have been tightened to the desired torque, locking device 10 is installed such that locking rings 12 and 14 each encircle one of the fastener heads 22. Locking rings 12 and 14 are then crimped so that they protrude into indentations 23 to prevent rotation of fastener heads 22. Advantageously, locking rings 12 and 14 are crimped such that the top of locking rings 12 and 14 fit beneath the tops of indentations 23, thereby preventing locking device 10 from separating from fastener heads 22.

Locking device 10 is shown in use with fasteners 26 in FIG. 6. In this FIGURE, locking device 10 is used in a manner similar to that shown in FIG. 4; locking rings 12 and 14 encircle one of the fastener heads 28 and are crimped so that they protrude into indentations 27 to prevent rotation of the fastener heads 28. As in FIG. 4, locking rings 12 and 14 are advantageously crimped such that the top of locking rings 12 and 14 fit beneath the tops of indentations 27, thereby preventing locking device 10 from separating from fastener heads 28.

As can be noted from the figures, locking device 10 does not fit between the fastener heads and the component and, therefore, locking device 10 does not bear any preload stress from the fastener head.

Also, while locking device 10 is shown in use with fasteners which are made in accordance with the present invention, locking device 10 may also be used with standard fasteners, such as standard hex-head bolts or nuts, and locking rings 12 and 14 are simply bent to conform to the shape of the standard fastener heads. However, if used with these standard fasteners, while preventing rotation, locking device 10 may not be constrained from separating from the fastener heads.

Additionally, because locking rings 12 and 14 are deformed to fit the fastener heads by simply crimping, they may be of sufficient diameter to allow for large tolerances in diameters of fastener heads as well as large tolerances in the distance between fastener heads.

Figure 8:
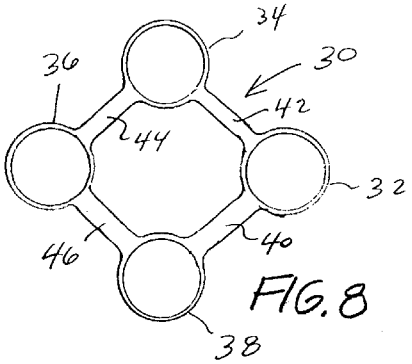
FIG. 8 is a plan view of a four-ringed locking device in accordance with a further embodiment of the invention.

A further embodiment of the present invention is shown in FIG. 8. A locking device 30 comprises four locking rings 32, 34, 36, and 38, and four torque members 40, 42, 44, and 46, interconnecting the four locking rings. Locking device 30 is used in a similar manner to locking device 10 and, like locking device 10 is produced in standard sizes for such applications as may require particular bolt patterns.

Figure 9:
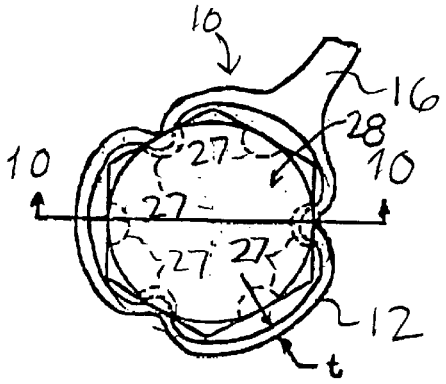
FIGS. 9 and 10 are, respectively, a top plan view and cross-sectional view taken along line 10—10 of FIG. 9, of a third embodiment of the invention.
Figure 10:
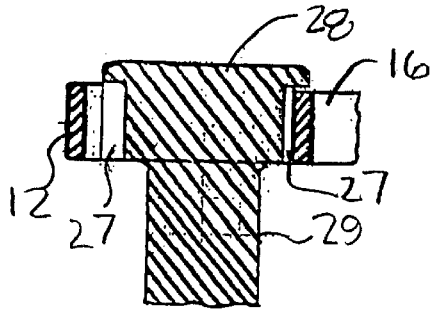

Referring to FIGS. 9 and 10, a further embodiment of the invention is shown. This embodiment is similar to that of FIGS. 6 and 7 and corresponding elements have been given the same reference numerals. In this embodiment, as discussed above, the indentations or crimp slots 27 are located in the flat faces of the hex-head bolt head 28. This is important because some installations require full use of the available fastener torque, which could be lost by putting the crimp slots on the corners as in FIGS. 6 and 7. By putting the slots on the flat faces, no appreciable loss in the ability to adequately torque the hex-head fastener 28 (during installation or removal) will result, enabling higher installation and removal torques for the fastener. Accordingly, if high installation and removal torques are a concern for hex-head fasteners, then the crimp slots should be placed on the flat faces as in FIGS. 9 and 10 instead of the corners or vertices as in FIGS. 6 and 7.

The lock cup 10 should be made of any readily deformable material that remains in the deformed state and retains its strength once deformed to fit into the bolt head grooves. Appropriate materials would be all moderately ductile metals, including stainless steels, aluminum, copper alloys, nickel alloys, and many others. However, appropriate non-metallic materials can also be used, and the exact material used depends on the application. One reason for this is that many fasteners are now being made of non-metallic materials such as Teflon and various plastics. In this regard, a non-metallic material might be used with a thermal crimper that melts the material into a deformed groove to fit the bolt head grooves. Obviously, non-metallic fasteners would require an appropriate locking cup which might either be metal or non-metal. As in any construction of lockwashers or fasteners, the actual application would dictate the required holding forces necessary to keep the fastener from loosening.

All fastener heads that are required to be locked in place would be required to be modified so that the lock-cup crimps would have a place to "hold." The slots or indentations should normally be placed where the material thickness is greatest. Not all slots have to be used however. The number of slots to be used (and thus the number of crimps) is dictated by the loosening forces to be restrained. It is also noted that although only socket-head cap screws and hex-head cap screws have been discussed, the invention can be used for any fastener that has adequate material thickness for the crimps.

It will be appreciated that the thickness t of the locking cup 10 should be of a dimension that is easier to crimp, and the inside diameter d of the lock-cup 10 should be such as to provide sufficient material for crimping. Further, the diameter of the crimping groove should be chosen to provide room for crimping material inside the groove. Further, the web thickness of the lock-cup 10 should be chosen based on the possible torque loadings (where stress is critical) or on a nominal thickness of at least that of the locking cup thickness.

Since the basic construction of the invention is universal, intended applications include any device, machine, or part that needs to lock the bolt head in place and capture the locking cup. The use of locking devices to prevent fasteners from loosening is very widespread. Applications include the following: (1) defense related equipment which must be able to withstand shock from explosions without losing integrity, such as submarine and ship critical equipment, aircraft, and land vehicles; (2) computer critical hardware where a loose fastener might damage an expensive component or prevent the hardware from operating properly (such as hard drives and computer-controlled data retrieval devices); (3) nuclear areas including internal reactor components, radiological "clean" areas where loose fasteners might prevent operation of important, radiologically contaminated devices such as underwater robotics used for nuclear fuel cell transporting, and the like; (4) vibrating or compacting machinery in the waste, mining, or petroleum industries; (5) undersea critical equipment or machinery where a lost fastener might cause expensive down-time or personnel safety concerns; (6) aerospace industries which manufacture rocket components, jet engines, or satellites which experience severe vibrations during transit and in which a loose fastener could jeopardize the mission or people; (7) aircraft industry which must rely on high-strength fasteners to minimize the weight of components as well as retain their fastener preloads for proper operation and personnel safety; (8) other industries where maintaining fastener preloads are important and loose fasteners are undesirable, but where manufacturing costs might be lowered by using a process that could be more easily automated than by using manually-bent locktabs; and (9) piping industry for preventing flange bolts from loosening.

For example, nuclear reactors are complex assemblies that may contain many fasteners within the reactor vessel where the reactor coolant flows. In order to have the highest confidence that fasteners do not loosen through vibration and fall into the flow stream, thus endangering the core cooling flow, severely damaging the reactor coolant pumps, or preventing important valves from operating properly, it is necessary to prevent the fasteners from loosening and also capture the locking device. This is where captured locking devices are required.

Although the present invention enables high strength fasteners to be captured, there is no requirement that high-strength bolts be used. However, the lock-cup of the invention would be especially useful where high shock loading is encountered. For example, the Navy requires designs on their submarines to be able to withstand shock loading from weapons detonation. These detonations can cause stresses large enough to permanently deform lockwashers under the bolt heads. When this happens, the lockwasher becomes slightly thinner. If the lockwasher becomes thinner, the bolted joint loses some of its initial preload (preload is the tension within the fastener by virtue of the threading process and is usually specified to be greater than the highest loads likely to be experienced). Loss of initial preload could result in unacceptable joint separation (i.e., separation of two bolted surfaces) during future shock load. Since the invention eliminates the lockwasher and prevents the fasteners from loosening, the bolts retain their preload after shock loading.

Figure 1:
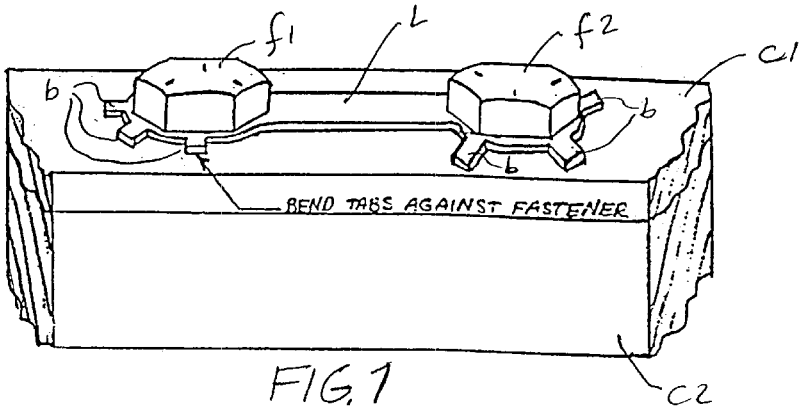
FIG. 1 is a perspective view of a prior art lockplate installed before use.

Since the invention can be used universally, high shock loading is not necessarily a prerequisite for its use. In fact, the invention could be appropriate for a high volume manufacturing process where a machine may install lock-cups and crimp them automatically. For high volume manufacturing, an automated process should be more cost-effective than having people fold locktabs on typical lock-plates (as with the prior art shown in FIG. 1.).

Figure 11:
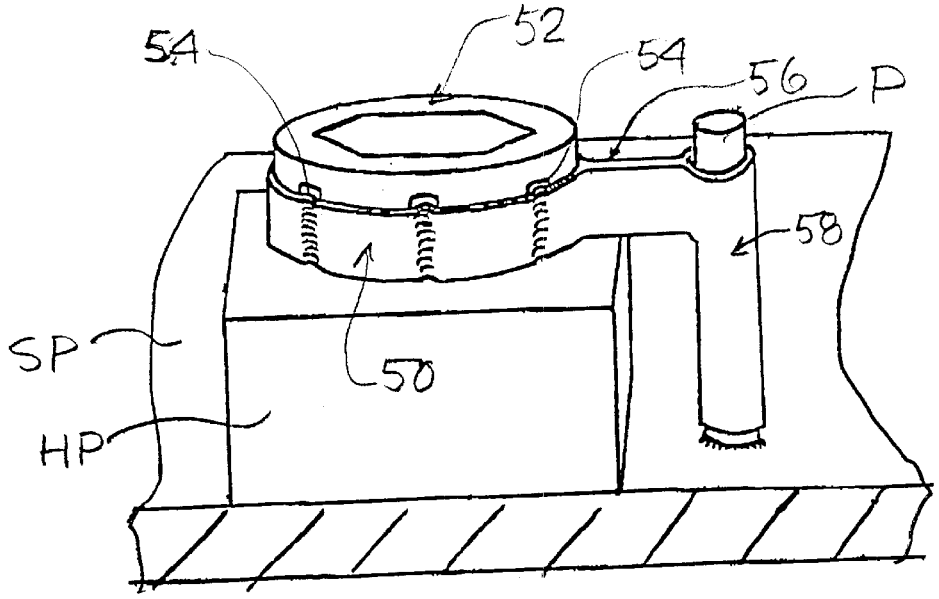
FIG. 11 is a perspective view of yet another embodiment of the invention.
Figure 12:
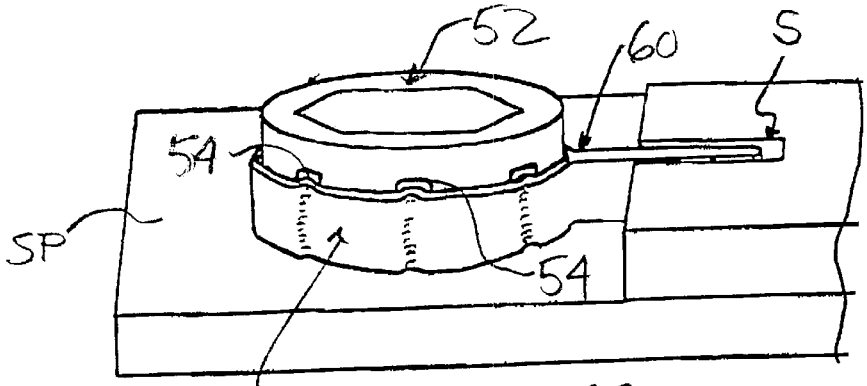
FIG. 12 is a perspective view of a still further embodiment of the invention.

Although the invention has discussed relative to embodiments wherein the locking cup extends around two fasteners, two fasteners are not needed. For example, referring to FIGS. 11 and 12, two embodiments are shown. In these embodiments, a locking cup 50 is used with a single fastener 52 having slots or indentations 54. In the embodiment of FIG. 11, the stationary part is indicated at SP and the part to be held at HP, and the gripping portion of the locking cup 50 is connected by a flange 56 to a cylindrical portion 58 which fits over a post P. In the embodiment of FIG. 12, an outwardly extending flange or extension 60 of cup 52 fits into a slot S. In general, in this application, one end of the locking cup can be attached to any fixed portion of the part of the device by spot welding, or by slipping one end of the locking cup over a post (as in FIG. 11) or other feature of the device, or can be captured between two other parts. Further, more than two fasteners can also be captured.

Advantageously, additional embodiments of the locking device may be provided which include various numbers and configurations of locking rings and torque members. Additionally, further embodiments of fasteners may be provided with various shapes and configurations of indentations.

In a further preferred embodiment of the present invention, locking devices are provided with fasteners in a kit for use in particular applications.

Although the invention has been described in detail with respect to preferred embodiments thereof, it will be apparent to those skilled in the art that variations and modifications can be effected in these embodiments without departing from the spirit and scope of the invention.

I claim:

1. A locking device for preventing rotation of a plurality of threaded fasteners having fastener heads having sides that vary in radial dimension, said locking device comprising:

a plurality of locking rings, each surrounding the sides of a respective fastener head, each said locking ring being made from a pliable material so as to be deformable to closely fit the sides of the respective fastener head; and a torque member, connected to each said locking ring, for providing torque to prevent each said locking ring and said respective fastener head from rotating.

2. A locking device as in claim 1, wherein two said locking rings are connected by a single torque member.

3. A locking device as in claim 1, wherein four said locking rings are connected by four torque members.

4. A locking device as in claim 1 wherein each said fastener head has a plurality of indentations circumferentially spaced therearound.

5. A locking device as in claim 4, wherein each of said plurality of locking rings has a height and each of said plurality of indentations in each said fastener head is of a height greater than the height of its respective locking ring.

6. A locking device as in claim 4, wherein each of said fastener head has a top and each of said plurality of indentations in said fastener head is positioned only in the sides of said fastener head such that the indentation does not extend to said top of said fastener head.

7. A locking device as in claim 6, wherein said fastener heads are hexagonal in shape and said indentations are formed in flat faces of the sides.

8. A locking fastener kit for joining components, said kit comprising:

a plurality of threaded fasteners having cylindrically shaped fastener heads, each said fastener head having a plurality of indentations circumferentially spaced around the sides of said fastener head; and a locking device comprising:

a plurality of locking rings, each surrounding the sides of a respective one of said fastener heads, each said locking ring being made from a pliable material so as to be deformable to closely fit the sides of said respective one of said fastener heads; and a torque member, connected to each said locking ring, for providing torque to prevent each said locking ring and said respective one of said fastener heads from rotating.

9. A locking fastener kit as in claim 8, wherein each of said plurality of locking rings has a height and each of said plurality of indentations in each said fastener head is of a height greater than the height of its respective locking ring.

10. A locking fastener kit as in claim 9, wherein each said fastener head has a top and each of said plurality of indentations in said fastener head is positioned only in the sides of said fastener head such that the indentation does not extend to said top of said fastener head.

11. A locking fastener kit as in claim 10, wherein said fastener heads are hexagonal in shape and said indentations are formed in flat faces of the sides.

12. A locking device for preventing rotation of at least one threaded fastener having a fastener head having sides that vary in radial dimension and that include a plurality of indentations therein, said locking device comprising:

at least one locking ring configured to surround the sides of a respective fastener head, said locking ring being made from a pliable material so as to be deformable to closely fit the sides of the respective fastener head and to fit into at least two of said plurality of indentations; and a torque member connected to said locking ring, for providing torque to prevent said locking ring and the respective fastener head from rotating.

* * * * *